3,291,360
MACHINE FOR THE MANUFACTURE OF BEAMS AND THE LIKE

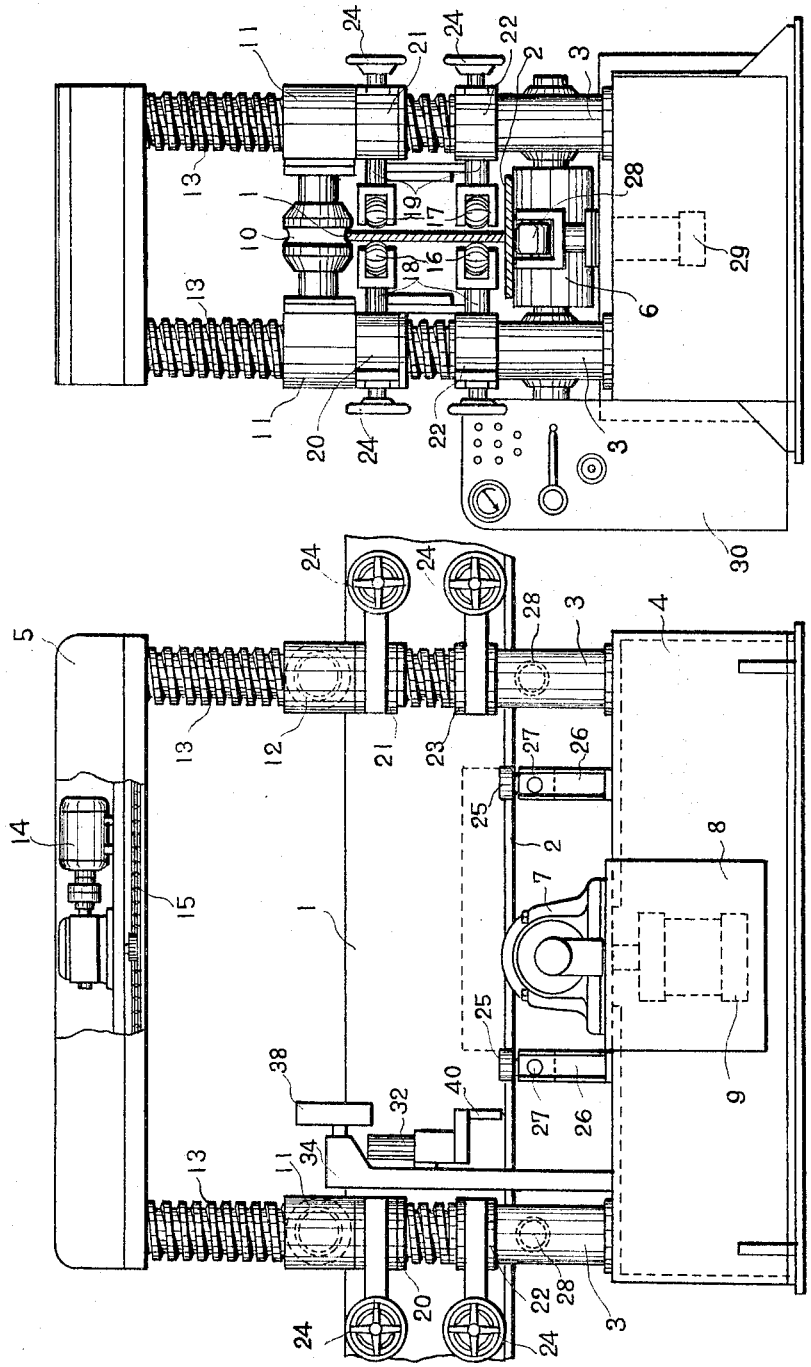

Carl Eric Linnander, Goteborg, Sweden, assignor to Pullmax Aktiebolag, Goteborg, Sweden, a corporation of Sweden
Original application Mar. 19, 1962, Ser. No. 180,621, now Patent No. 3,171,375, dated Mar. 2, 1965. Divided and this application Jan. 18, 1965, Ser. No. 426,275
5 Claims. (Cl. 228—44)

This application is a division of application Serial No. 180,621, filed March 19, 1962, now Patent No. 3,171,375.

The present invention relates to machines for the manufacture of beams by welding. It is known to manufacture beams by welding together strip-shaped or channel elements in such relative positions that the composite structure has the desired beam section. For instance, a T-beam may be made of two plate strips corresponding to the web plate and the flange plate, said strips being welded together after they have been fixed in a relative position corresponding to the T-section. It is important that these sectional elements are firmly and immovably held in their relative position during the welding. Up until now, fixtures have been used for this purpose, wherein the various parts of the beam are aligned and engaged throughout the length of the beam by means of screw joints or the like.

Moreover, in welding unsymmetrical beam sections, for instance, T-sections, it may occur that the beam is subjected to permanent deformations by the shrinking stresses remaining after welding. Thus, it may occur that a T-beam is bent toward the web plate. As a matter of fact, the web plate is heated during the welding operation so as to expand adjacent the edge, engaging the flange plate, the beam then bending towards the flange plate. The shrinking occurring after cooling will not be sufficient for straightening the beam, which is thus permanently deformed.

The present invention has for its object, a simplification of the operation of aligning and fixing the sectional elements in such a way as to enable a continuous, automatic working procedure to be carried out while the sectional elements are fed along through a machine adapted for the purpose. The invention is chiefly characterized in that the sectional elements are guided, while being fed along in their longitudinal direction, between laterally effective backing members in such a way that they are caused to assume proper relative positions in a path of travel defined by the backing members, the elements at the same time being pressed against each other at the joints. Aligning and fixing of the sectional elements thus occur continuously according as they are fed along in their path of travel. Thus, the machinery necessary herefor only has to extend along a part of the total length of the beam. From the moment when the sectional elements are fed into the machine, they are guided into their corresponding path of travel by backing members in the form of rollers or the like, which support the sectional elements laterally so that they are automatically brought together and fixed in the proper relative position during the continuous longitudinal travel. After the sectional elements have thus been fixed against each other, a welding operation may be performed, either while the sectional elements are continuously fed along or in steps while the feeding movement has been intermittently stopped.

The inconvenience of shrinkage after welding operation may be avoided according to the present invention by the backing members being arranged in such a way that pre-stresses are set up in the beam plates during their passage through the machine, which pre-stresses oppose and compensate for the tendency towards bending caused by the welding. The pre-stresses are suitably created by the beam plates being exposed to bending stresses which in turn generate material stresses opposing said tendency towards bending.

The invention will be described in greater detail below with reference to the annexed drawings, in which:

FIG. 1 is an elevation of a machine according to the invention,

FIG. 2 is an end view of the machine with the welding means omitted,

Figure 3:
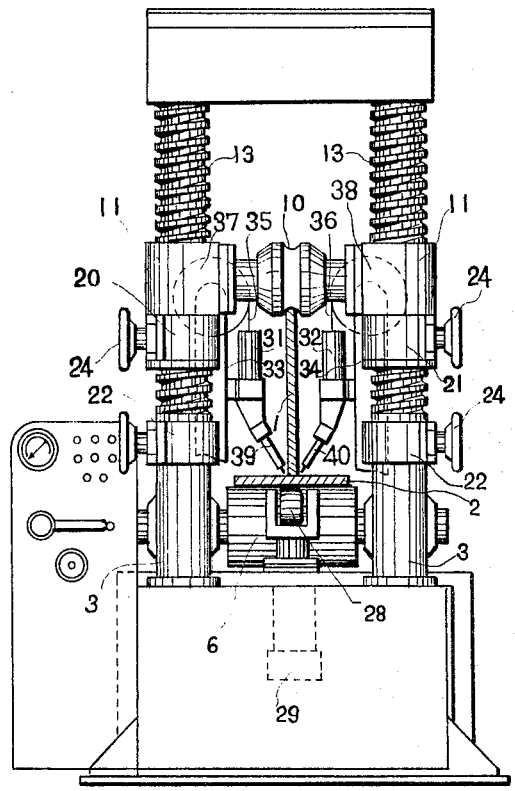
FIG. 3 is an end view of the machine backing rollers omitted.

The drawings show a machine in which the beam plates are exposed to bending stresses during their passage through the machine, which stresses are intended to compensate for the bending tendency caused by the welding. The machine illustrated by way of example in the drawings is designed for manufacturing T-beams comprising a web plate 1 and a flange plate 2. The frame of the machine comprises generally four columns 3 disposed in pairs adjacent each other at the inlet and outlet ends of the machine and are positioned on a box-shaped base plate 4. At the top, the columns are connected by a box-shaped section 5. Halfway between the two pairs of columns a backing roller 6 is arranged which engages the underside of the flange plate. The roller 6 is mounted in two bearings 7 which are rigidly secured on the horizontal central part of a caliper-shaped slide member 8 whose vertical shanks extend over the box 4 and are guided by the vertical side faces of the box. The roller 6 may be raised and lowered by means of a piston and cylinder actuator disposed within the box 4. The top edge of the web plate 1 is guided in two grooved rollers 10 whose shafts are mounted in two sleeves 11 and 12 respectively, which are internally threaded and adapted to engage screws 13 forming rotatable parts of the columns 3. The sleeves 11, 12 may be raised and lowered by turning the screws 13. In order to bring about a simultaneous raising or lowering of both backing rollers 10, the screws 13 are coupled by chains 15 to an electric motor 14 disposed in the top section 5, said chains running about sprockets mounted on the ends of the screws 13.

The web plate 1 is supported along its side faces by backing rollers 16, 17 disposed between each pair of columns 3 which rollers are disposed in pairs opposite each other on the ends of stub shafts 18, 19 which are displaceably guided in sleeves 20, 21 and 22, 23 respectively. The pair of rollers 16 in cooperation with the pair of rollers 17 constitute one set of supporting and guide rollers for the side faces of the web plate. The upper sleeves 20, 21 are screwed onto the screws 13 so as to be adjusted vertically, while the sleeves 22, 23 are disposed on the fixed lower parts of the columns 3. The backing rollers 16, 17 may be adjusted perpendicularly to the web plate by means of hand wheels 24. They may be swung out of working position by turning of the sleeves 20, 23 about the longitudinal axes of the columns, as is most clearly seen in FIG. 4. The flange plate 2 is guided laterally by rollers 25 which are disposed in two pairs on either side of the flange plate, one pair at each of two points between the two pairs of columns 3. Said rollers are mounted on posts 26 positioned on the box 4, said posts forming at the same time supports or bearings for guide rods 27 on the ends of which the bearings of the roller 25 are adjustably mounted in such a way that they may be adapted to various widths of the flange plate. Below the path of travel of the flange plate there is disposed between the two pairs of columns 3, two rollers 28 supporting the beam plates, which rollers may be pressed to engagement with the underside of the flange plate 2 by means of a driving device 29 arranged within the box 4. The two pairs of rollers 25 constitute one set of supporting and guide rollers for the flange plate, and the two rollers 28 constitute a second set of supporting and guide rollers for the flange plate. The lower backing roller 6 is adapted to be driven by means of a motor disposed in a control cabinet 30.

After the beam plates 1, 2 have been pushed into their positions between the backing rollers so that the web plate 1 is supported between the rollers 10 and 28, the lower backing roller 6 is raised to engagement with the underside of the flange plate 2 with such a force that the plates are bent between the support points formed by the rollers 10, the bending being adjusted in such a way that the stresses caused thereby in the web plate and the flange plate becomes enough so as to oppose and compensate for the bending tendency in the opposite direction developed during the welding operation. In the continued feed of the beam plates through the machine, there is a corresponding bending occurring successively in the subsequent portions of the beam plates. The welding may then take place automatically during a continuous feed of the beam plates by means of welding members stationarily arranged on the frame.

Figure 4:
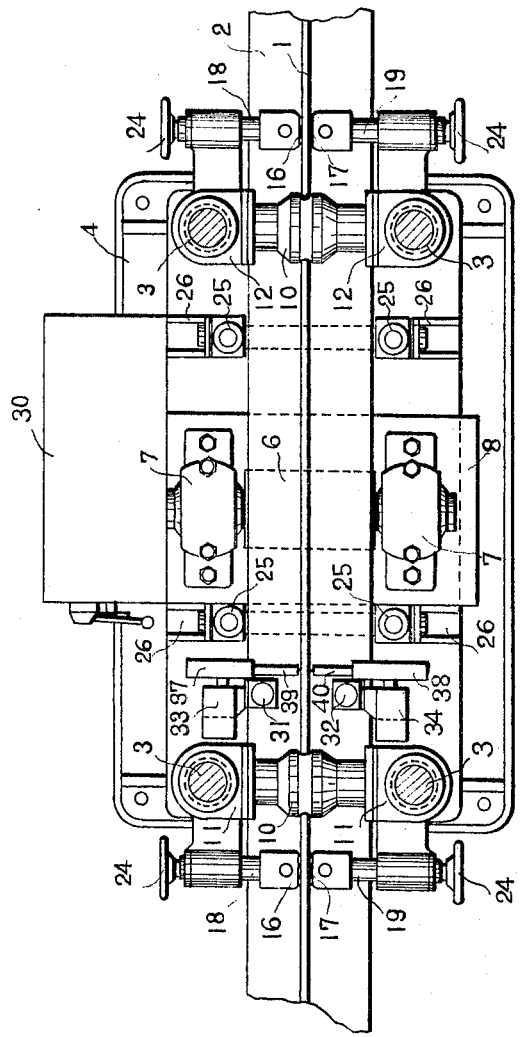
FIG. 4 is a plan of the machine.

As illustrated by way of example, two welding heads 31 and 32 are mounted on brackets 33 and 34 secured to the box-shaped base plate 4 at the positions shown in FIGS. 1 and 4. Welding wires 35, 36 are supplied from drums 37, 38 to nozzles 39, 40 which are adjustably secured to the welding heads 31 and 32 respectively.

The welding may be performed in a manner known per se, either by means of stationarily arranged welding members as mentioned above or by means of welding members adapted to be moved along the joints while the plates are at a standstill In the last mentioned case, the welding must of course be carried out in steps after the plates have been successively displaced a distance approximately corresponding to the length of the machine.

What I claim is:

1. In a machine for manufacturing unsymmetrical beams composed of web and flange elements welded together while being advanced along a path of travel, said beams having a tendency to deform after the welding operation, means for feeding and positioning said elements comprising at least two sets of supporting and guide rollers for the side faces of a web plate and at least two sets of supporting and guide rollers for a flange plate, said web and flange supporting and guide rollers being spaced along said path of travel and arranged to hold said elements in proper mutual position for welding, one of said sets of supporting and guide rollers for said flange plate being positioned to back up the underside of the flange plate and another of said sets of supporting and guide rollers for said flange plate being positioned to support the lateral faces of the flange plate, means comprising an intermediate backing roller for setting up of pre-stresses of beam plates opposing and compensating for the tendency to deform caused by the welding, said supporting and guide rollers for the side faces of said web plate comprising at least one set of movable rollers disposed at the adjacent portion of the inlet end and at least one set of movable rollers disposed at the adjacent portion of the outlet end of said machine, said backing and guide rollers for the lateral faces of said flange plate comprising a first pair of rollers disposed adjustably on either side of said flange plate at a first point of the path of travel and a second pair of rollers disposed adjustably on either side of said flange plate at a second point of the path of travel, each of said pairs of rollers being adjustable to fit various widths of said flange plate, said one of said sets of supporting and guide rollers for said flange plate being comprised of a first roller disposed at the adjacent part of the inlet end and a second roller disposed at the adjacent part of the outlet end of said machine so as to support said flange plate and press to engage with the underside of said flange plate, said means for setting up of pre-stresses comprising a first grooved guide roller disposed at the inlet end and a second grooved guide roller disposed at the outlet end of said machine so as to guide the top edge of said web plate, said intermediate backing roller being arranged so as to engage the underside of said flange at the intermediate position between said two grooved guide rollers and being movable upward and downward so as to provide the desired bending of said web plate.

2. A machine according to claim 1, providing support members for said supporting and guide rollers for the side faces of said web plate, comprising a first pair of columns positioned at the adjacent position of the inlet end and a second pair of columns positioned at the adjacent position of the outlet end of said machine, upper sleeves being screwed onto a screw portion of said column respectively, lower sleeves being disposed on the fixed lower parts of said columns, stub shafts being displaceably guided in said sleeves respectively and supporting rotatably said supporting and guide rollers for the side faces of said web plate.

3. A machine according to claim 1, in which the intermediate backing roller serves as a driving roller for feeding the beam plates along.

4. A machine according to claim 3, in which there is provided a frame for said driving roller, which frame may be raised and lowered and is disposed between the pairs of columns.

5. A machine according to claim 4, in which said columns comprise partly rotatable screws provided with means for simultaneous raising or lowering of said supporting and guide rollers for the side faces of said web plate, said screws each being provided with a sprocket mounted on one end thereof, a motor having transmission means being provided for rotating said screws, and a chain being provided engaging said transmission means and said sprockets whereby transmission from said transmission means to said screws is effected.

References Cited by the Examiner
UNITED STATES PATENTS 2,179,802  11/1939  Sykes _____ 214—102
2,179,803  11/1939  Sykes _____ 214—102

CHARLIE T. MOON, *Primary Examiner.*

WHITMORE A. WILTZ, *Examiner.*

M. L. FAIGUS, *Assistant Examiner.*